Patented Oct. 17, 1922.

1,432,629

UNITED STATES PATENT OFFICE.

WALTER SMITH, OF LONDON, ENGLAND.

TREATMENT OF CLAYS AND IN THE MANUFACTURE OF ARTICLES AND MATERIALS THEREFROM.

No Drawing.        Application filed September 1, 1921.   Serial No. 497,663.

*To all whom it may concern:*

Be it known that I, WALTER SMITH, a subject of the King of Great Britain, residing at 30 Inverness Terrace, London, W. 2., England, have invented new and useful Improvements in the Treatment of Clays and in the Manufacture of Articles and Materials Therefrom (for which I have made application for patent in Great Britain dated May 13, 1919, Patent No. 149,440), of which the following is a specification.

This invention relates to the treatment of clays of any suitable variety or composition, and their conversion into products having a substance or body inherently combining properties of clays and of carbon, and the invention has for its object the intensive deposition and distribution of carbon in the amorphous or other state of fine sub-division throughout the pores and interstices of the clay so that it shall permeate, saturate and soak the clay to the highest degree, rendering the material itself and articles composed thereof extremely carbonaceous, adapted to withstand high temperatures, say above 1700° C., and inert to the action of acids.

According to the invention I attain my object very economically by the destructive distillation of suitable carbonaceous materials in proximity to, or incorporated with clay by any convenient means, the volatile carbon compounds being liberated from the carbonaceous material employed, so as to charge with residual carbon the infinitesimal pores of the clay particles, after the water of combination has been expelled by heating.

In carrying the invention into effect, and as an example of one method, I incorporate with clay a suitable material of volatile carbon content, as for instance bituminous or oil shale, from which gases charged with carbon may be liberated and excess carbon deposited within the pores of the clay at certain temperatures. The relative proportions of clay and shale may desirably be such that complete saturation shall be effected when heat is applied to the composite mass. The blending may also be in requisite quantities to ensure plasticity after tempering the material in any usual manner or by another method. Clay bricks or other clay articles, having no admixture of carbonaceous material are embedded in powdered coal, oil shale or peat and fired in covered crucibles, or other vessels. During such operation the brick, or other article, greedily absorbs the carbons evolved from the heated carbonaceous bedding material, and when drawn from the kiln is found to be highly charged with atomic carbon.

It is desirable to note in connection with this process that the divisibility of the clay particle is practically ad infinitum, there being in practice millions of particles obtainable to the gram. By saturation, according to the invention, the most minute and microscopical of such particles is reached and infused with fine carbon, producing a black dense composition or body which is literally carbonized clay.

It should further be noted that the maximum porosity of the clay particle occurs during the biscuit stage of the firing, that is, broadly speaking, in the interval after the chemically combined water has been driven off, and before incipient fusion of the body of the clay commences. It is at a point reached while passing through this period only, therefore, that clay can be charged with atomic carbon to the limit. Moreover, this receptive physical state, and the liberation of carbon for absorption by the clay, can be caused to occur simultaneously during the ordinary firing operation, as a result of the intimate association of clay with suitable carbonaceous substances, and heating as above described.

Modification of the process may be carried out by biscuiting clay articles to the requisite degree of porosity and charging with gases or liquids which are subsequently caused by heating or by chemical action, or otherwise, to deposit carbon within the pores of clay after the water of combination has been expelled.

The firing as an example of one method, is effected by burning articles having a composite body of clay and oil shale, the articles meanwhile being embedded in powdered coke, or oil shale, compressed around them in such a manner that obstruction shall be offered to the volatiles liberated from the body of the articles at certain temperatures. The resistance thus offered to the escaping gases is important, since the deposit of residual carbon may be governed largely by the density of the embedding material. Furthermore, when oil shale is employed in place of coke, the gases discharged by the heated embedding material itself, react on the volatiles in process of delivery from the composite articles, thus creating a pressure which results in very intensive carbonization of the clay.

After firing to low temperatures, say 700° to 800° C. the clay treated will in general be found to be densely charged with carbon, permeated throughout the myriads of pores.

When clay is treated according to this invention and fired to very high temperatures, say above 1600° C., it becomes extremely hard, and resembles certain carbides, such for instance as carborundum. In this condition the treated material may be ground down and used as an abrasive. It is desirable to state that different clays, such as ball, china and fireclays, when treated by this process, will give dissimilar degrees of hardness for abrasives, and specific resistant properties against the action of acids and other chemical compounds.

The distinctive process of this invention as compared with those employed in the manufacture of plumbago crucibles, carbon bricks and similar goods, is that the composition of such articles is usually carbon bonded by clay; they are thus merely mixtures of clay and carbon. Such articles have within themselves no provision against the attack of air and flame, preservation must therefore be effected by artificial means, otherwise they burn away. In the manufacture of carbon ware as produced by this invention, the clay is not mechanically mixed with carbon, nor is carbon bound together by clay, but the clay substance or body is saturated and permeated by atomic particles of the element, which may be sealed up into the clay by heating to the necessary degree of contraction thus producing a combination of clay and carbon capable of resisting the open flame.

I am aware that it has before been proposed to produce refractory material by treating a mixture of carbon and refractory substances, such as magnesite or the like, exposed to a glowing heat with carbon-containing or carburetted gases or vapours or with hydrocarbons of the fatty and aromatic series; that it has been proposed to manufacture polishing and cleaning powder by calcining and grinding shale; and that it has also been proposed to make alumina tubes by mixing powdered alumina with a binder, such as tar or paraffin and then firing to a high temperature.

According to this invention the introduction of carbonaceous material is made with the object of charging clay with fine carbon, as nearly as possible to a point of complete saturation; less carbon content may exist, but the element in smaller quantities would in some instances be detrimental, tending to lower the melting point of the clay; also, the methods of firing are adopted with the object of charging clay with carbon while the clay is in a state of maximum porosity, and of retaining the full charge of carbon by means of contraction of the mass.

The carbonized clay may be treated with clay slips, glazes or enamels, when found desirable for any special purposes.

What I claim is:—

1. The production of articles of clay saturated with carbon by heating clay together with a material containing volatile carbon compounds with the exclusion of air so as to drive off the water of combination and the volatiles and leave the excess carbon within the mass of the article.

2. The production of articles of clay saturated with carbon by impregnating clay with volatile carbon compounds and heating the mass so formed with the exclusion of air so as to drive off the water of combination and the volatiles and to leave the excess carbon within the clay.

In testimony that I claim the foregoing as my invention I have signed my name this 18th day of August 1921.

WALTER SMITH.